(12) United States Patent
Roy (10) Patent No.: US 11,568,859 B2
(45) Date of Patent: Jan. 31, 2023

(54) METHOD AND APPARATUS FOR EXTRACTING KEY INFORMATION FROM CONVERSATIONAL VOICE DATA

(71) Applicant: UNIPHORE SOFTWARE SYSTEMS INC., Palo Alto, CA (US)

(72) Inventor: Somnath Roy, Chennai (IN)

(73) Assignee: UNIPHORE SOFTWARE SYSTEMS, INC., Palo Alto, CA (US)

( * ) Notice: Subject to any disclaimer, the term of this patent is extended or adjusted under 35 U.S.C. 154(b) by 0 days.

(21) Appl. No.: 17/033,644

(22) Filed: Sep. 25, 2020

(65) Prior Publication Data

US 2022/0068263 A1    Mar. 3, 2022

(51) Int. Cl.
| | | |
|---|---|---|
| G10L 15/14 | (2006.01) | |
| G10L 15/20 | (2006.01) | |
| G10L 15/22 | (2006.01) | |
| G10L 15/08 | (2006.01) | |

(52) U.S. Cl.
CPC .............. *G10L 15/14* (2013.01); *G10L 15/20* (2013.01); *G10L 2015/088* (2013.01); *G10L 2015/228* (2013.01)

(58) Field of Classification Search
CPC ... G10L 15/14; G10L 15/20; G10L 2015/088; G10L 2015/228
USPC ....................................................... 704/231
See application file for complete search history.

(56) References Cited

U.S. PATENT DOCUMENTS

| | | | | |
|---|---|---|---|---|
| 11,170,032 | B2* | 11/2021 | Bender | G06Q 30/02 |
| 2018/0150739 | A1* | 5/2018 | Wu | G06N 20/10 |
| 2020/0135197 | A1* | 4/2020 | Nakanishi | G10L 13/027 |
| 2021/0092222 | A1* | 3/2021 | Kang | H04M 3/42221 |

OTHER PUBLICATIONS

P. Rosso, L. Hurtado, E. Segarra and E. Sanchis, "On the Voice-Activated Question Answering," in IEEE Transactions on Systems, Man, and Cybernetics, Part C (Applications and Reviews), vol. 42, No. 1, pp. 75-85, Jan. 2012, doi: 10.1109/TSMCC.2010.2089620. (Year: 2012).*

(Continued)

*Primary Examiner* — Bharatkumar S Shah
(74) *Attorney, Agent, or Firm* — Praveer K Gupta (57) ABSTRACT

A computer-implemented method and apparatus for extracting key information from conversational voice data, where the method comprises receiving a first speaker text corresponding to a speech of a first speaker in a conversation with a second speaker, the conversation comprising multiple turns of speech between the first speaker and the second speaker, the first speaker text comprising multiple question lines, each question line corresponding to the speech of the first speaker at a corresponding turn, arranged chronologically. Feature words are identified, and a frequency of occurrence therefor in each question line is determined. Question lines without any of the feature words are removed, to yield candidate question lines, for each of which a mathematical representation is generated. A similarity score for each candidate question line with respect to each subsequent candidate question line is computed, and the line with the highest score is identified as a key question.

15 Claims, 4 Drawing Sheets

(56) References Cited

OTHER PUBLICATIONS

H. Ho, V. C. Mawardi and A. B. Dharmawan, "Question answering system with Hidden Markov Model speech recognition," 2017 3rd International Conference on Science in Information Technology (ICSITech), 2017, pp. 257-262, doi: 10.1109/ICSITech.2017.8257121. (Year: 2017).*

A. Salekin, H. Wang, K. Williams and J. Stankovic, "DAVE: Detecting Agitated Vocal Events," 2017 IEEE/ACM International Conference on Connected Health: Applications, Systems and Engineering Technologies (CHASE), 2017, pp. 157-166, doi: 10.1109/CHASE.2017.74. (Year: 2017) (Year: 2017).*

\* cited by examiner

METHOD AND APPARATUS FOR EXTRACTING KEY INFORMATION FROM CONVERSATIONAL VOICE DATA

CROSS-REFERENCE TO RELATED APPLICATIONS

This application claims priority to the Indian Patent Application No. 202011037362, filed on Aug. 31, 2020, herein incorporated by reference in its entirety.

FIELD

The present invention relates generally to identifying key information from a conversation, and particularly to extracting key information from conversational voice data.

BACKGROUND

Several businesses need to provide support to its customers, which is provided by a customer care call center. Customers place a call to the call center, where customer service agents address and resolve customer issues pertaining to a business. An agent, who is a user of a computerized call management system, is expected to address the issue(s) raised by the customer to the satisfaction of the customer. Call management systems may help with an agent's workload, complement or supplement an agent's functions, manage agent's performance, or manage customer satisfaction, and in general, such call management systems can benefit from understanding the content of a conversation.

Accordingly, there exists a need for automated identification of key information from a conversation, which may be used by call management systems for further processing.

SUMMARY

The present invention provides a method and an apparatus for extracting key information from conversational voice data, substantially as shown in and/or described in connection with at least one of the figures, as set forth more completely in the claims. These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and an apparatus for extracting key information from conversational voice data. Audio of a conversation comprising two speakers, for example, a customer (or a first speaker) and an agent (or a second speaker), may be diarized if needed, and is transcribed into text data to yield separate lines of text corresponding to speech of each turn of each speaker in the conversation. Words that are not essential to a conversation, also referred to as stop words are identified, for example, from a pre-defined dictionary of such stop words, and/or defined manually. Such stop words include filler words such as 'umm', 'hmm', or functional words such as 'of', 'in, 'on' and the like, among other non-essential words, and such stop words may vary from one domain to another domain (e.g., insurance, medical, automotive). From all words in the transcribed conversation, the stop words are removed, and frequencies of words remaining after the removal of the stop words are identified. Words having a frequency higher than a pre-defined threshold are defined as feature words. The lines of the conversation not having the feature words are discarded, which reduces a high-dimensional conversation to a low-dimensional space. Since each line is a vector, the load associated with processing such lines is reduced significantly.

For each of the remaining lines (that is, the lines that are not discarded), a mathematical representation is determined. For each of the lines corresponding to the speech of the customer, that is, a speaker posing a query (question), concern, or request, a correlation score with every subsequent or following line for the customer is determined. Each correlation score represents a measure of relatedness between two lines, and all such scores with the subsequent lines are summed up, to yield a summation correlation score for each question line. The question line with the highest summation correlation score is identified as the key question. For each of the lines corresponding to the speech of the agent, that is, a speaker providing a response or an answer to the posed query (question), concern, or request, a correlation score is determined with the identified key question, and with every subsequent or following line for the agent, and all such scores are summed up, to yield a summation correlation score for each response line. The response line with the highest summation correlation score is identified as the key response. In some embodiments, the summation correlation score for a line (question line or answer line) is multiplied with the sum of the frequency of each of the feature words in that line, to yield a frequency-weighted summation correlation score for that line.

Either of the summation correlation question score or the weighted summation correlation question score may be used as a similarity question score. The question line having the highest similarity question score is identified as the key question. Similarly, either of the summation correlation response score or the weighted summation correlation response score may be used as a similarity response score. The response line having the highest similarity response score is identified as the key response.

Figure 1:
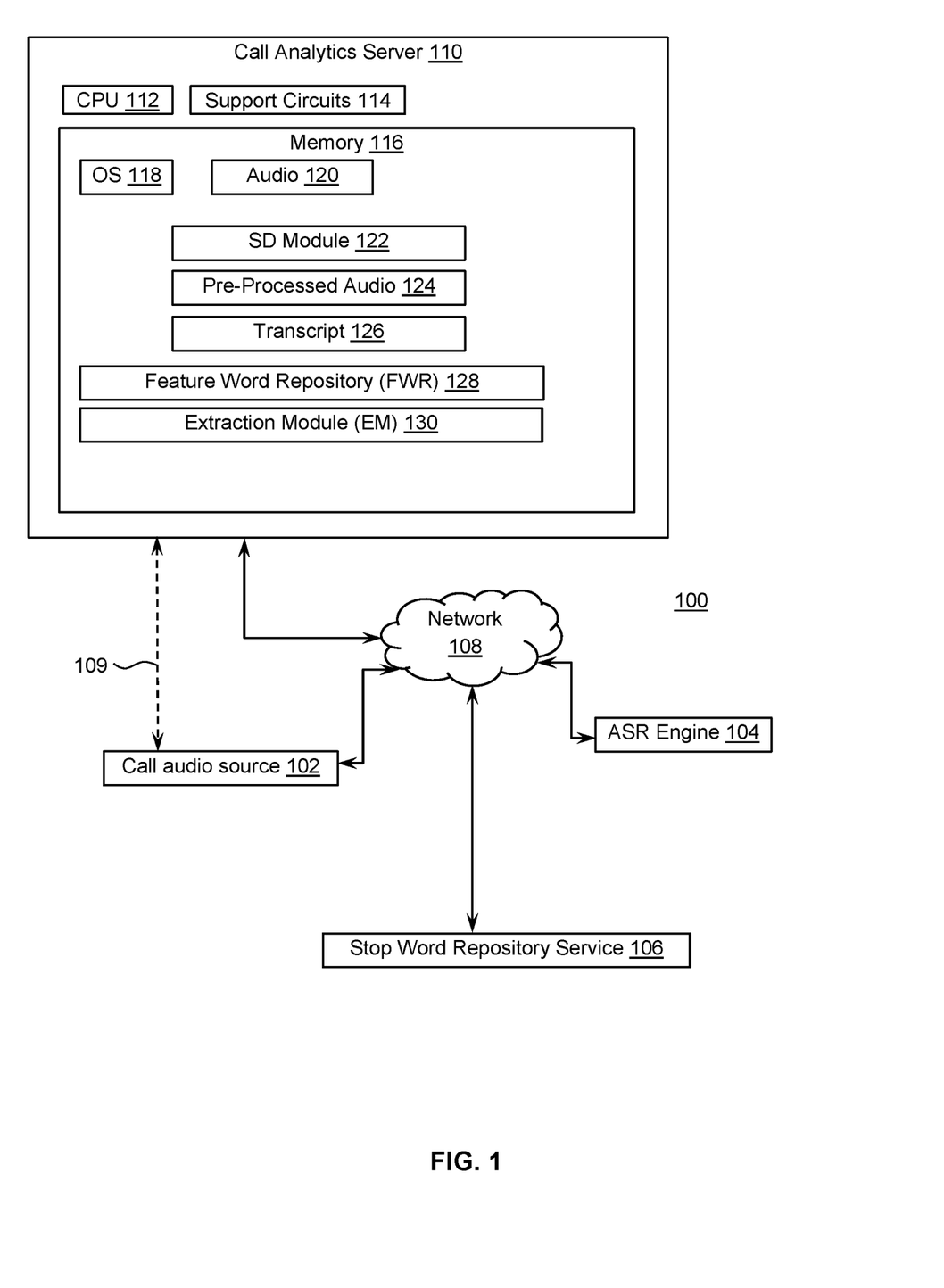
FIG. 1 is a schematic diagram depicting an apparatus for extracting key information from conversational voice data, in accordance with an embodiment of the present invention.

FIG. 1 is a schematic diagram an apparatus 100 for predicting customer behavior, in accordance with an embodiment of the present invention. The apparatus 100 is deployed, for example, in a call center or associated with a call center. The apparatus 100 comprises a call audio source 102, an ASR engine 104, a stop word repository service 106, and a call analytics server (CAS) 110, each communicably coupled via a network 108. In some embodiments, the call audio source 102 is communicably coupled to the CAS 110 directly via a link 109, separate from the network 108, and may or may not be communicably coupled to the network 108.

The call audio source 102 provides audio of a call to the CAS 110. In some embodiments, the call audio source 102 is a call center providing live audio of an ongoing call. In some embodiments, the call audio source 102 stores multiple call audios, for example, received from a call center.

The ASR engine 104 is any of the several commercially available or otherwise well-known ASR engines, providing ASR as a service from a cloud-based server, or an ASR engine which can be developed using known techniques. The ASR engines are capable of transcribing speech data to corresponding text data using automatic speech recognition (ASR) techniques as generally known in the art. In some embodiments, the ASR engine 104 may be deployed on the CAS 110 or may be local to the CAS 110.

The stop word repository service 106 includes one or more stop word repository(ies) relating to one or more domain(s), including, but not limited to healthcare insurance, medical services, home mortgage services, and the like.

The network 108 is a communication network, such as any of the several communication networks known in the art, and for example a packet data switching network such as the Internet, a proprietary network, a wireless GSM network, among others. The network 108 communicates data to and from the call audio source 102 (if connected), the ASR engine 104, the stop word repository service 106, and the CAS 110. The link 109 is a communication channel, and includes a network similar to the network 108, or a direct communication channel (wired or wireless).

The CAS server 110 includes a CPU 112 communicatively coupled to support circuits 114 and a memory 124. The CPU 112 may be any commercially available processor, microprocessor, microcontroller, and the like. The support circuits 114 comprise well-known circuits that provide functionality to the CPU 112, such as, a user interface, clock circuits, network communications, cache, power supplies, I/O circuits, and the like. The memory 116 is any form of digital storage used for storing data and executable software. Such memory includes, but is not limited to, random access memory, read only memory, disk storage, optical storage, and the like.

The memory 116 includes computer readable instructions corresponding to an operating system (OS) 118, an audio 120 (for example, received from the call audio source 102), a speaker diarization (SD) module 122, a pre-processed audio 124, transcripts 126 of the pre-processed audio 124, a feature word repository 128, and an extraction module (EM) 130.

According to some embodiments, the audio 120 is processed by the SD module 122 to diarize the audio 120 according to each speaker. The SD module 122 generates distinct segments of audio corresponding to different speakers' speech at each turn, yielding the speaker-diarized pre-processed audio 124, containing distinct speech/audio segments according to speaker. The diarized audio segments from the pre-processed audio 124 are then transcribed, for example, by the ASR engine 104, which yields text transcripts 126 corresponding to the pre-processed audio 124.

That is, the transcripts 126 comprise distinct lines corresponding to distinct segments of audio, each segment corresponding to a distinct speaker, comprised in the pre-processed audio 124. Each of the lines of the transcript 126 may include timestamps corresponding to the audio 120 or pre-processed audio 124, or may otherwise be arranged chronologically. According to some embodiments, the transcript 126 comprising lines according to the speech of each speaker at each turn, is obtained using one or more of known techniques, such as, speaker diarization and automatic speech recognition.

The feature word repository (FWR) 128 comprises feature words. From all words spoken in the conversation (for example, as obtained in the transcribed text of the conversation), stop words, that is words that are not essential in a conversation, are removed. Stop words include filler words, which typically do not have a meaning in the context of the conversation, but are spoken to fill the silence, functional words such as 'in', 'a', 'the', and other words that do not contribute to the substance of a conversation. Such stop words may be obtained from pre-defined list of stop words. In some embodiments, the stop words are obtained from a service in the cloud, for example, the stop word repository service 106. Stop words may vary according to different domains, and according to some embodiments, the stop word repository service 106 comprises stop words for a particular domain, for example, healthcare insurance, medical services, home mortgage services, among others. In some embodiments, the stop words are defined by a user of the apparatus 100, or any component thereof, or provided otherwise in a known manner. For the words remaining after removing the stop words, a frequency of occurrence in a conversation is determined. The words having a frequency higher than a predetermined threshold value are defined as feature words, which are included in the FWR 128.

For example, in some embodiments, the threshold value is defined as 3. The feature words obtained as above, having a frequency of 3 or above in the conversation, are expected to include words which are essential components in that conversation, and do not include, for example, non-essential stop words, such as, "of," "in," "on," or words which have lower relevance to a conversation, among others. Several feature words and/or stop words may vary according to a domain of the conversation. For example, in a conversation relating to the healthcare insurance domain, the words "deductible" or "plan" would be feature words, but may not be a feature word in, for example, a conversation relating to a real-estate mortgage. According to some embodiments, the FWR 128 comprises feature words for a particular domain. In a conversation relating to a particular domain, the feature words are expected to be spoken a particular number of times, based on which a threshold value may be decided. For example, the word "plan" may be expected to be spoken 5 times, on an average, in a conversation relating to healthcare insurance, and therefore, the expected frequency for the feature word "plan" in the healthcare insurance domain is 5, and the threshold value in such examples may be set to 4 or 5. According to some embodiments, the FWR 128 excludes non-essential words specific to the particular domain it relates. According to some embodiments, the FWR 128 is populated or updated using the stop word repository service 106, for example, as discussed above. The stop word repository service 106 is communicably coupled to the CAS 110 via the network 108.

The extraction module (EM) 130 performs various computations on the transcribed lines from the transcript 126 and the feature words from the FWR 128, to extract key information from the conversation, for example, as described with respect to the methods described below. The key information includes one or more key questions (spoken by a first speaker, for example, the customer), and/or one or more key responses (spoken by a second speaker, for example, the agent).

Figure 2:
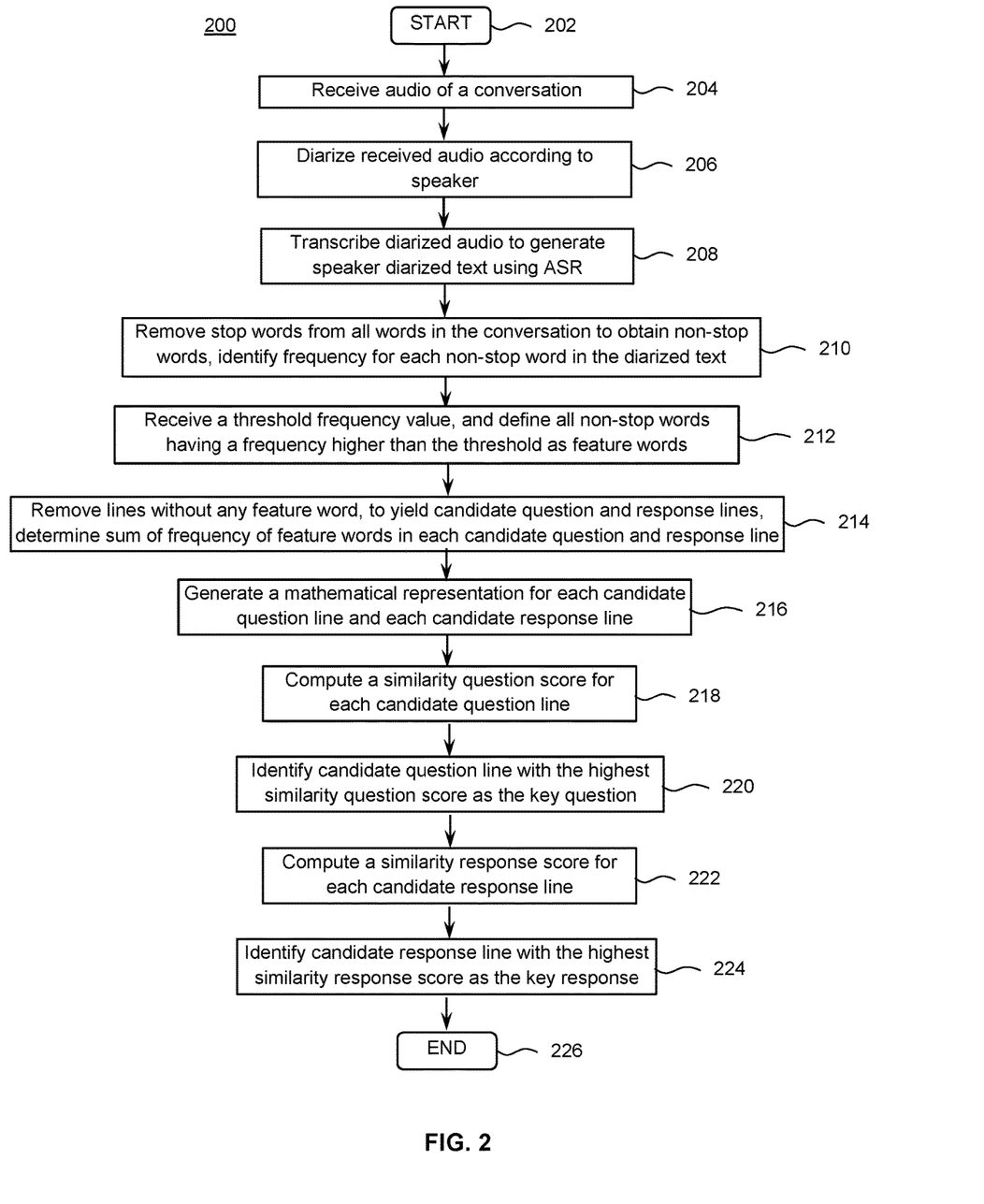
FIG. 2 is a flow diagram of a method for extracting key information from conversational voice data, for example, as performed by the apparatus of FIG. 1, in accordance with an embodiment of the present invention.

FIG. 2 is a flow diagram of a method 200 for extracting key information from conversational voice data, for example, as performed by the apparatus 100 of FIG. 1, in accordance with an embodiment of the present invention.

The following techniques are based on a hypothesis that if a line of a conversation represents a key information or question, then succeeding lines or turns should be similar to such a line. In other words, if a line is a well proposed question, or includes well formulated key information, then following lines would be in the context of such a line only, be similar to such a line, and include similar concepts and/or terminology. One party to the conversation may advance a question, or a statement, based on which the other party to the conversation may provide an answer, a clarification or additional information, and the conversation will advance with back and forth communication between the conversing parties in this manner. The conversation subsequent to the line with the key information or question would reasonably be similar to the line with the key information or question.

The method 200 starts at step 202, and proceeds to step 204, at which the method 200 receives an audio, for example, the audio 120. The audio 120 may be a pre-recorded audio received from an external device such as the call audio source 102, for example, a call center or a call audio storage, or recorded on the CAS 110 from a live call in a call center. The audio 120 includes a conversation between first speaker and a second speaker, for example, a customer and a customer service agent, respectively. Typically, the customer calls a customer service center with a question, a concern, a request and the like (hereinafter referred to as a "question"), and seeks a resolution for the question. The agent, who responds to the customer's call, seeks to provide the resolution to the customer by providing a suitable response to the customer's question (hereinafter referred to as a "response").

At step 206, the method 200 pre-processes or diarizes the audio 120 according to the speaker to yield the pre-processed-audio 124 comprising separate audio segments according to each speaker. In some embodiments, step 206 is performed by the SD module 122 of FIG. 1, using known techniques. Generally, the customer or the agent speaks continuously till finished, or interjected by the agent or customer, respectively, or otherwise interrupted. Each such portion of continuous speech is referred to as a "turn," and diarization refers to separating or identifying such turns. In some embodiments, the CAS performs the method 200, where the steps 204 and 206 are performed by the SD module 122, and step 208 onwards are performed by the extraction module 130.

At step 208, the method 200 transcribes speaker diarized audio to generate a transcript of the conversation, for example, the transcript 126 including speaker diarized text corresponding to the speech in the speaker diarized audio, for example, using known automatic speech recognition (ASR) techniques. The transcript 126 includes transcribed text corresponding to the speech of each speaker, arranged in the order it was spoken, that is, chronologically. The transcribed text corresponding to the speech of each turn is referred to as a "line."

In some embodiments, the speaker diarized audio is sent from the CAS 110 to the ASR engine 104 to be transcribed, and in response, the transcribed text is received from the ASR engine 104 at the CAS 110, and stored as the transcript 126. In some embodiments, the ASR engine 104 is implemented on the CAS 110, or implemented in a local environment of the CAS 110. In some embodiments, sending the pre-processed audio 124 to the ASR 104, and receiving the transcribed text from the ASR engine 104, and storing as the transcript 126 is performed by the EM 128 of FIG. 1.

While speaker diarization and ASR processing are described herein, in some embodiments, the method 200 begins at step 202, and obtains the transcript 126, including text lines for each speaker separated and arranged chronologically, directly, obviating steps 204-208. As an example, a sample transcript of a conversation in the domain of home mortgage, between a customer and an agent, arranged chronologically or sequentially in the order of the turn of a speaker, with a marker whether it is the agent or the customer, and line numbers, as presented below, may be obtained by the method 200 at the conclusion of the step 208:

<Begin Transcript>
1. Agent hello thank you for calling if you name a service or support center this is karen may get your name and seller service or number
2. Customer hi karen it's
3. Agent thank you and can you confirm your phone number and e-mail address please
4. Customer NA
5. Agent thank you and how can i help you today
6. Customer i'm gonna give you a fanny may number i was calling in reference to please
7. Agent absolutely
8. Customer NA
9. Agent NA
10. Customer correct
11. Agent okay okay but what's going on with this loan
12. Customer okay
13. Agent or what your question
14. Customer well mister's at audio was in foreclosure of the day before his sharp sale date he has filed a chapter thirteen bankruptcy we just received you know a copy of the plan which this loan is not included in the plan under their new loss mitigation program with the bankruptcy court he's going to get another loan modifications through fannie mae new field bank so that's something that we should be looking into he's already had two failed modifications for non-payment
15. Agent okay so so you receive notification that the day before prior to the foreclosure sale he had filed for chapter thirteen and per
16. Customer correct
17. Agent the per the laws the new loss met he's gonna be going into another modification
18. Customer right
19. Agent after two failed is for non-payment
20. Customer correct
21. Agent and answer your question is whether or not that should happen or whether 22. Customer yeah i mean kind of a bankruptcy judge mandate that we offer him a third
23. Agent okay if you don't mind if i'm put you in a brief hold i'm gonna look into that
24. Customer modification
25. Agent moment thank you
26. Customer thank you
27. Agent michelle thank you so much for holding him
28. Customer you're
29. Agent so i you know if allows a limit of three loan modification so it shouldn't impact impact our policy and if judges or court is ordering it um you know there might not be much that you can do but we would recommend that you check with your foreclosure returning to see if you have any recourse in that situation given that they're thirty two months delinquent and sounds like this you know could be a
30. Customer welcome
31. Agent stall tactic
32. Customer oh he's a chronic stall or he's not gonna pay he's not gonna pay
33. Agent right
34. Customer he is not gonna pay and apparently you can he has six months to get a modification if that doesn't work isn't the judge will give him another six months and then there's a final attempt time to give him three more months so this is just gonna sit here just doing nothing for another fifteen months it's ridiculous we can file an objection to the plan and i wanted to find out if that's something that i'm permitted to do
35. Agent right let me check on that if you don't mind
36. Customer okay
37. Agent holding thanks michelle my apologies
38. Customer hi
39. Agent i just i wanted to make sure i've got all my ducks in a row on this one so basically so wanna try when the chapter thirteen was filed that the default requires a court to determine the rate payment plan and the borrower will be making payments to the trustee and then the trustee will in turn and release those funds to the different creditors so you would need to offer a modification to the borrower and the attorney handling the bankruptcy needs to work with the trustee to determine the amount the servicer would expect to receive what you would expect to receive um you know while in while in chapter thirteen on this plan the bar would make the payments to the trustee not to you guys so this isn't your typical modification
40. Customer right
41. Agent in that
42. Customer but my
43. Agent sense
44. Customer point is this is a weird bankruptcy new field bank is excluded from the chapter thirteen plan like the arrears are not included and you know in any way shape or form in there which is over forty four thousand dollars they don't want to put that in there because these payments are go up too high they want to do a loan modification for the arrears and you know get them set up on a whole new payment plan
45. Agent okay
46. Customer you want me to
47. Agent okay
48. Customer talk to someone else wanted to explain what's going on
49. Agent well i mean i i i can relay this part back but alright so so basically new field bank was excluded from the b k
50. Customer correct there is no repayment option whatsoever for the arrears the only plan for a new field bank is for him to get a modification
51. Agent and are are you working with a bankruptcy attorney on this or
52. Customer we're working with our fannie mae approved foreclosure attorney they have a bankruptcy department i mean should i be working with them i thought you guys controlled what can and cannot be done
53. Agent sit so we can provide assistance on executing them out in the reporting and all the and things of that nature but we're not able to provide the legal guidance in terms of all of this
54. Customer okay so i should basically be calling the approved attorney and finding out what my options are
55. Agent right
56. Customer okay
57. Agent yes yeah i'm for it for the legal aspect of this certainly
58. Customer okay i'll i'll try the enough and i have any other questions i'll definitely reach out to you guys again
59. Agent okay please do
60. Customer alright
61. Agent oh and
62. Customer thank
63. Agent NA
64. Customer you
65. Agent NA
66. Customer yeah
67. Agent i'm sorry can i can you confirm the spelling of your first and last name is it one I r two
68. Customer NA
69. Agent thank you at new
70. Customer you're
71. Agent field
72. Customer welcome
73. Agent bank.com
74. Customer correct
75. Agent thank you so much for calling the fannie mae service
76. Customer you're
77. Agent support
78. Customer welcome
79. Agent i hope you have a great
80. Customer you too
81. Agent day
82. Customer bye-bye
83. Agent thanks bye-bye <End Transcript>

At step 210, the method 200 obtains stop words, for example, from the stop word repository service 106, or as an input to the apparatus 100 using known techniques. Still at step 210, the method 200 removes stop words from all words spoken in the conversation, to obtain non-stop words, and identifies a frequency for each non-stop words in the lines of the diarized text.

At step 212, the method 200 receives a threshold for the frequency. The threshold may be input to the method 200, or may be a pre-determined value. The threshold is set to identify pertinent words, potentially representing a key issue, concern, question or information, in the conversation. In some embodiments, the threshold of the expected frequency for each feature word depends on the domain of the conversation. For example, the threshold for the frequency may be set to 3. For each of the non-stop words having a frequency greater than the threshold, the method 200 identifies such non-stop words as feature words. Continuing with the example of the sample transcript presented above, the feature words having an expected frequency higher than the threshold (e.g., 3) for the domain of home mortgage is obtained from the FWR 128, and shown below:

['na', 'loan', 'foreclosure', 'filed', 'thirteen', 'bankruptcy', 'know', 'plan', 'new', 'court', 'another', 'field', 'bank', 'payment', 'receive', 'modification', 'months', 'pay', 'payments', 'trustee', 'attorney', 'arrears', 'working']

For example, each of the words in between single quotes is a feature word having an expected frequency of greater than or equal to 3.

At step 214, the method 200 removes lines which do not contain any feature words, for example, the feature words identified above, to yield candidate question lines and candidate response lines, corresponding to question lines and response lines, respectively, for example, as shown below. In addition, for each candidate question or response line, a total frequency score, which is a sum of frequency of each feature word in that line is determined. For example, if a line has two feature words, a first feature word occurring four times, and a second feature word occurring five times, then the line has a frequency score of nine (4+5=9), which is the sum of the frequency of the first and the second feature words.

Candidate Question Lines:
{14: [["well mister"s at audio was in foreclosure of the day before his sharp sale date he has filed a chapter thirteen bankruptcy we just received you know a copy of the plan which this loan is not included in the plan under their new loss mitigation program with the bankruptcy court he"s going to get another loan modifications through fannie mae new field bank so that"s something that we should be looking into he"s already had two failed modifications for non-payment", 13]],
22: [["yeah i mean kind of a bankruptcy judge mandate that we offer him a third", 1]],
24: [["modification", 1]],
32: [["oh he"s a chronic stall or he"s not gonna pay he"s not gonna pay", 1]],
34: [["he is not gonna pay and apparently you can he has six months to get a modification if that doesn"t work isn"t the judge will give him another six months and then there"s a final attempt time to give him three more months so this is just gonna sit here just doing nothing for another fifteen months it"s ridiculous we can file an objection to the plan and i wanted to find out if that"s something that i"m permitted to do", 5]],
44: [["point is this is a weird bankruptcy new field bank is excluded from the chapter thirteen plan like the arrears are not included and you know in any way shape or form in there which is over forty four thousand dollars they don"t want to put that in there because these payments are go up too high they want to do a loan modification for the arrears and you know get them set up on a whole new payment plan", 12]],
50: [["correct there is no repayment option whatsoever for the arrears the only plan for a new field bank is for him to get a modification", 6]],
52: [["we"re working with our fannie mae approved foreclosure attorney they have a bankruptcy department i mean should i be working with them i thought you guys controlled what can and cannot be done", 4]],
54: [["okay so i should basically be calling the approved attorney and finding out what my options are", 1]]}

Candidates Response Lines:
{11: [["okay okay but what"s going on with this loan", 1]],
15: [["okay so so you receive notification that the day before prior to the foreclosure sale he had filed for chapter thirteen and per\n", 4]],
17: [["the per the laws the new loss met he"s gonna be going into another modification", 3]],
19: [["after two failed is for non-payment", 1]],
29: [["so i you know if allows a limit of three loan modification so it shouldn"t impact impact our policy and if judges or court is ordering it um you know there might not be much that you can do but we would recommend that you check with your foreclosure returning to see if you have any recourse in that situation given that they"re thirty two months delinquent and sounds like this you know could be a", 6]],
39: [["i just i wanted to make sure i"ve got all my ducks in a row on this one so basically so wanna try when the chapter thirteen was filed that the default requires a court to determine the rate payment plan and the borrower will be making payments to the trustee and then the trustee will in turn and release those funds to the different creditors so you would need to offer a modification to the borrower and the attorney handling the bankruptcy needs to work with the trustee to determine the amount the servicer would expect to receive what you would expect to receive um you know while in while in chapter thirteen on this plan the bar would make the payments to the trustee not to you guys so this isn"t your typical modification", 12]],
49: [["well i mean i i i can relay this part back but alright so so basically new field bank was excluded from the b k", 3]],
51: [["and are are you working with a bankruptcy attorney on this or", 3]],
69: [["thank you at new", 1]],
71: [["field", 1]],
73: [["bank.com", 1]]}

Each line is identified by the line number, and appended with the total frequency score, or sum of frequency(ies) of all feature words in the line. For example, line 22 includes 1 instance of a feature word, namely, "bankruptcy," while line 49 includes 3 instances of feature words, namely, one each for the words "new," "field," and "bank."

At step 216, the method generates a mathematical representation for all candidate question and response lines. According to some embodiments, mathematical representation of a text line quantifies various words of the sentence, and represents the sentence mathematically, for example as a real-valued vector, such as an array or a determinant or an embedding. An example of such a mathematical representation is a mean-embedding vector obtained using fast-text embedding, which is a pre-trained model provided by FACEBOOK, INC. of Menlo Park, Calif., for use with English language. The fast-text embedding model takes a sentence as an input, and outputs a set of 300 numbers for each word of the sentence. For example, if a 5-word sentence is input, the output includes 300 numbers for each word, or a matrix of the order of 5×300 (5 rows×300 columns). The average for each column is calculated to obtain the mean-embedding vector. In the example of the 5-word sentence, each column comprises 5 values, and an average is computed for each, to generate the mean-embedding vector of the order of 1×300. In some embodiments, other embedding techniques using custom models, for example, transfer learning to generate embedding data for a specific application, may be used. In transfer learning, a pre-trained model, such as open source models, for example, fast-text embedding by FACEBOOK, INC. of Melo Park, Calif., BERT by GOOGLE, INC. of Mountain View, Calif., are fed with custom data to capture a more relevant representation of the type of input data for which embedding is desired. While embedding techniques are described herein for determining a mathematical representation, other mathematical representations known in the art may lend themselves to the techniques described herein in an equivalent manner within the scope of the claims appended hereto, and all such mathematical representations are contemplated herein.

Figure 3:
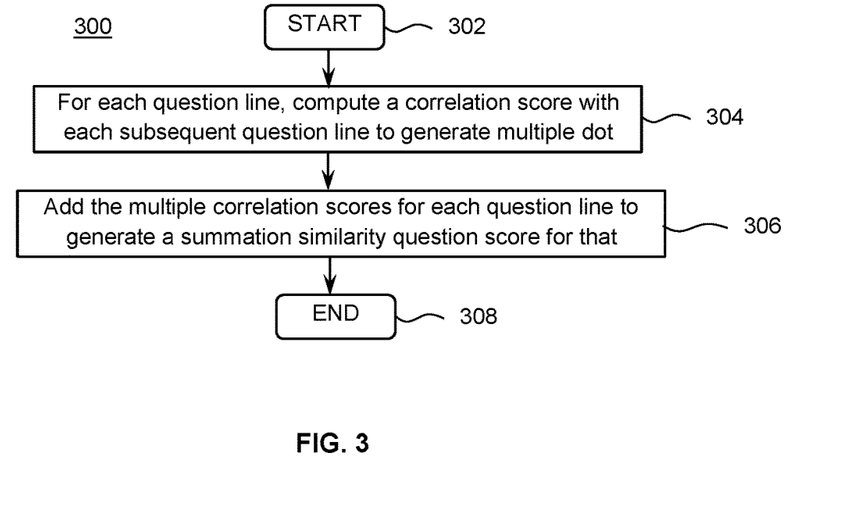
FIG. 3 is a flow diagram of a method for computing similarity question score, according to the method of FIG. 2, in accordance with an embodiment of the present invention.
Figure 4:
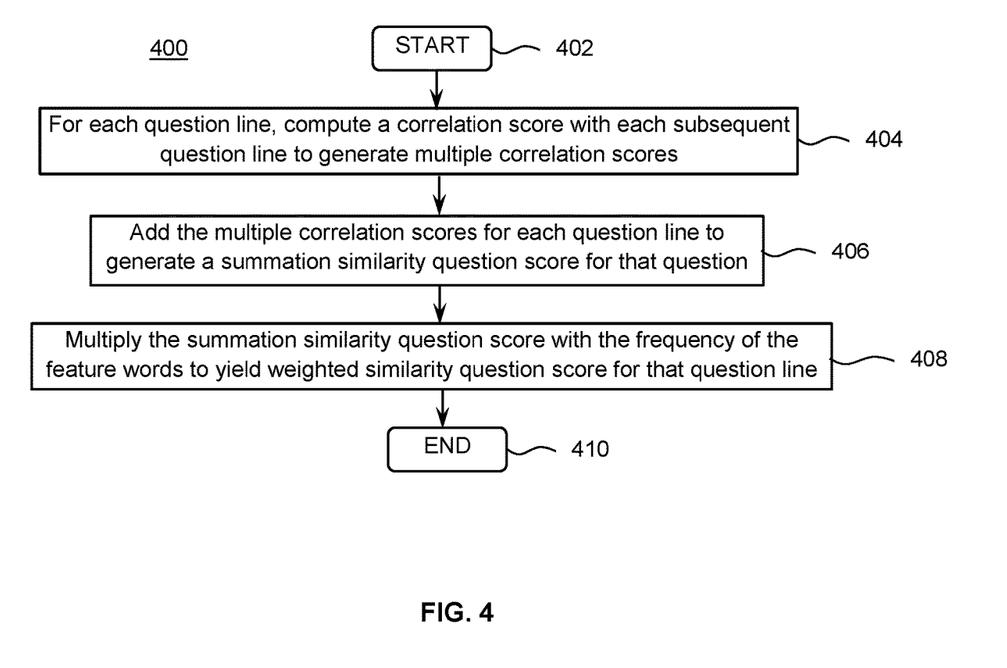
FIG. 4 is a flow diagram of a method for computing similarity question score, according to the method of FIG. 2, in accordance with an embodiment of the present invention.

At step 218, the method 200 computes a similarity question score for each candidate question line, for example, as described in further detail with respect to FIGS. 3 and 4. At step 220, the method 200 identifies the candidate question line with the highest similarity score as the key question.

Figure 5:
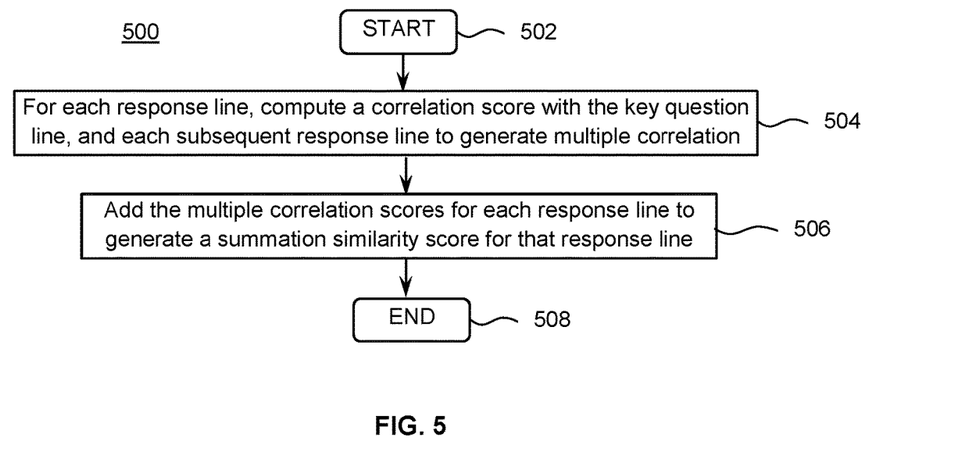
FIG. 5 is a flow diagram of a method for computing similarity response score, according to the method of FIG. 2, in accordance with an embodiment of the present invention.
Figure 6:
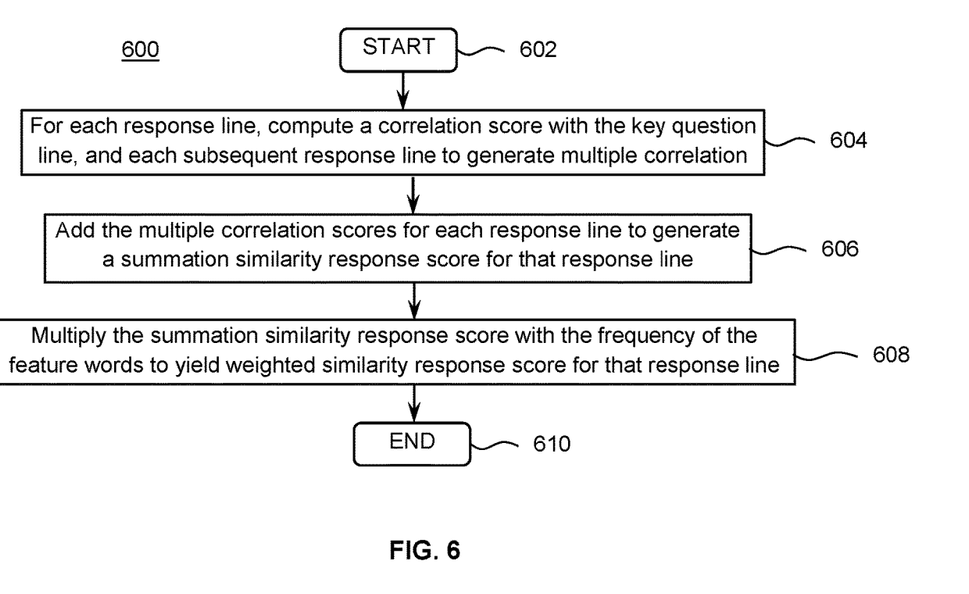
FIG. 6 is a flow diagram of a method for computing similarity response score, according to the method of FIG. 2, in accordance with an embodiment of the present invention.

At step 222, the method 200 computes a similarity response score for each candidate response line, for example, as described in further detail with respect to FIGS. 5 and 6. At step 224, the method 200 identifies the candidate response line with the highest similarity score as the key response.

The method 200 proceeds to step 226, at which the method 200 ends.

FIG. 3 is a flow diagram of a method 300 for computing similarity question score, for example, according to step 218 of the method 200 of FIG. 2, in accordance with an embodiment of the present invention.

The method 300 starts at step 302 and proceeds to step 304, at which, for a given candidate question line, the method 300 computes a correlation score with each subsequent candidate question line, to generate multiple correlation scores for the given candidate question line. The correlation score represents a measure of relatedness between two lines. According to some embodiments, computing the correlation score between two lines comprises computing a corresponding dot product score between an embedding of respective lines. According to some embodiments, computing the correlation score comprises computing the L2 norm or a square distance between the embedding of respective lines.

Continuing the example above, the line numbers that identify the candidate question lines having at least one feature word (expected frequency>threshold) are, in sequence: 14, 22, 24, 32, 34, 44, 50, 52 and 54. For the candidate question line 14, the correlation score is calculated with all subsequent lines, that is, for the following line pairs: {14, 22}, {14, 24}, {14, 32}, {14, 34}, {14, 44}, {14, 50}, {14, 52} and {14, 54}. For the candidate question line 50, the correlation score is calculated with all subsequent lines, that is, for the following line pairs: {50, 52} and {50, 54}. For the candidate question line 52, which has only one subsequent line, line 54, only a single correlation score {52, 54} is calculated. For the last candidate question line 54, no correlation score is calculated.

The method 300 proceeds to step 306, at which, the method 300 adds the correlation score(s) for each candidate question line, to provide a summation correlation question score for that candidate question line. Continuing the example, for candidate question line 14, the correlation scores of the line pairs {14, 22}, {14, 24}, {14, 32}, {14, 34}, {14, 44}, {14, 50}, {14, 52} and {14, 54} are added, for the candidate question line 50, the correlation scores of the line pairs {50, 52} and {50, 54} are added, and for the question line 52, only the correlation score for line pair {52, 54} is used without any additions. For the last candidate question line 54, no correlation score is calculated.

In some embodiments, the summation correlation question score is the similarity question score for each candidate question line. The similarity question score, so calculated, for each candidate question line is used to extract key information, such as the key question, according to the method 200 of FIG. 2. That is, the question line with the highest similarity question score is determined as the key question.

The method 300 proceeds to step 308, at which the method 300 ends.

FIG. 4 is a flow diagram of a method 400 for computing similarity question score, for example, according to step 218 of the method 200 of FIG. 2, in accordance with an embodiment of the present invention.

The method 400 starts at step 402 and proceeds to step 404, at which, for a given candidate question line, the method 400 computes a correlation score with each subsequent candidate question line, to generate multiple correlation scores for the given candidate question line. Continuing the example above, the line numbers that identify the candidate question lines having at least one feature word (expected frequency>threshold) are, in sequence: 14, 22, 24, 32, 34, 44, 50, 52 and 54. For the candidate question line 14, the correlation score is calculated with all subsequent lines, that is, for the following line pairs: {14, 22}, {14, 24}, {14, 32}, {14, 34}, {14, 44}, {14, 50}, {14, 52} and {14, 54}. For the candidate question line 50, the correlation score is calculated with all subsequent lines, that is, for the following line pairs: {50, 52} and {50, 54}. For the candidate question line 52, which has only one subsequent line, line 54, only a single correlation score {52, 54} is calculated. For the last candidate question line 54, no correlation score is calculated.

The method 400 proceeds to step 406, at which, the method 400 adds the correlation score(s) for each candidate question line, to provide a summation correlation score question score for that candidate question line. Continuing the example, for candidate question line 14, the correlation scores of the line pairs {14, 22}, {14, 24}, {14, 32}, {14, 34}, {14, 44}, {14, 50}, {14, 52} and {14, 54} are added, for the candidate question line 50, the correlation scores of the line pairs {50, 52} and {50, 54} are added, and for the question line 52, only the correlation score for line pair {52, 54} is used without any additions. For the last candidate question line 54, no correlation score is calculated.

The method 400 proceeds to step 408, at which, the method 400 multiplies the summation correlation question score for each candidate question line with the sum of frequencies of all the feature words present in that line, to yield weighted correlation question score for that candidate question line. Continuing the example, the sum of frequencies of all feature words, as obtained from FWR 128, appearing in line 14, is 13. That is, in line 14, one or more of the feature words appear 13 times. The summation correlation question score for candidate question line 14 is multiplied with 13, to provide a weighted correlation question score. Similarly, for each candidate question line, the summation correlation question score is multiplied by the frequency of appearance of the feature words in that candidate question line.

In some embodiments, the weighted correlation score question score is the similarity question score for each candidate question line. The similarity question score, so calculated, for each candidate question line is used to extract key information, such as the key question, according to the method 200 of FIG. 2. That is, the question line with the highest similarity question score is determined as the key question.

The method 400 proceeds to step 410, at which the method 400 ends.

FIG. 5 is a flow diagram of a method 500 for computing similarity response score, for example, according to step 222 of the method 200 according to the method of FIG. 2, in accordance with an embodiment of the present invention.

The method 500 starts at step 502 and proceeds to step 504, at which, for a given candidate response line, the method 500 computes a correlation score with the key question line, and with each subsequent candidate response line, to generate multiple correlation scores for the given candidate response line. Continuing the example above, the line numbers that identify the candidate response lines having at least one feature word (expected frequency>threshold) are, in sequence: 11, 15, 17, 19, 29, 39, 49, 51, 69, 71 and 73. For the candidate response line 11, the correlation score is calculated with the key question, for example, identified according to the method 200 of FIG. 2, and with all subsequent lines, that is, for the following line pairs: {11, 15}, {11, 17}, {11, 19}, {11, 29}, {11, 39}, {11, 49}, {11, 51}, {11, 71} and {11, 73}. For the candidate response line 69, the correlation score is calculated with the key question, and with all subsequent lines, that is, for the following line pairs: {69, 71} and {69, 73}. For the candidate response line 71, which has only one subsequent line, line 73, the correlation score is calculated with the key question and the line pair {71, 73}. For the last candidate response line 73, no correlation score is calculated.

The method 500 proceeds to step 506, at which, the method 500 adds the correlation score(s) for each candidate response line, to provide a summation correlation score response score for that candidate response line. Continuing the example, for candidate response line 11, the correlation scores of the line pairs {11, key question}, {11, 15}, {11, 17}, {11, 19}, {11, 29}, {11, 39}, {11, 49}, {11, 51}, {11, 71} and {11, 73} are added, for the candidate response line 69, the correlation scores of the line pairs {69, key question}, {69, 71} and {69, 73} are added, and for the response line 71, the correlation score for line pairs {71, key question} and {71, 73} are added. For the last candidate response line 73, no correlation score is calculated.

In some embodiments, the summation correlation response score is the similarity response score for each candidate response line. The similarity response score, so calculated, for each candidate response line is used to extract key information, such as the key response, according to the method 200 of FIG. 2. That is, the response line with the highest similarity response score is determined as the key response.

The method 500 proceeds to step 508, at which the method 500 ends.

FIG. 6 is a flow diagram of a method 600 for computing similarity response score, for example, according to step 222 of the method 200 of FIG. 2, in accordance with an embodiment of the present invention.

The method 600 starts at step 602 and proceeds to step 604, at which, for a given candidate response line, the method 600 computes a correlation score with the key question line, and with each subsequent candidate response line, to generate multiple correlation scores for the given candidate response line. Continuing the example above, the line numbers that identify the candidate response lines having at least one feature word (expected frequency>threshold) are, in sequence: 11, 15, 17, 19, 29, 39, 49, 51, 69, 71 and 73. For the candidate response line 11, the correlation score is calculated with the key question, for example, identified according to the method 200 of FIG. 2, and with all subsequent lines, that is, for the following line pairs: {11, 15}, {11, 17}, {11, 19}, {11, 29}, {11, 39}, {11, 49}, {11, 51}, {11, 71} and {11, 73}. For the candidate response line 69, the correlation score is calculated with the key question, and with all subsequent lines, that is, for the following line pairs: {69, 71} and {69, 73}. For the candidate response line 71, which has only one subsequent line, line 73, the correlation score is calculated with the key question and the line pair {71, 73}. For the last candidate response line 73, no correlation score is calculated.

The method 600 proceeds to step 606, at which, the method 600 adds the correlation score(s) for each candidate response line, to provide a summation correlation score response score for that candidate response line. Continuing the example, for candidate response line 11, the correlation scores of the line pairs {11, key question}, {11, 15}, {11, 17}, {11, 19}, {11, 29}, {11, 39}, {11, 49}, {11, 51}, {11, 71} and {11, 73} are added, for the candidate response line 69, the correlation scores of the line pairs {69, key question}, {69, 71} and {69, 73} are added, and for the response line 71, the correlation score for line pairs {71, key question} and {71, 73} are added. For the last candidate response line 73, no correlation score is calculated.

The method 600 proceeds to step 608, at which, the method 600 multiplies the summation correlation response score for each candidate response line with the sum of frequencies of all the feature words present in that line, to yield a weighted correlation response score for that candidate response line. Continuing the example, the sum of frequencies of all feature words, as obtained from FWR 128, appearing in line 11, is 1. That is, in line 11, the feature words appear only once. The summation correlation response score for candidate response line 14 is hence multiplied with 1, to provide a weighted correlation response score. Similarly, for each candidate response line, the summation correlation score is multiplied by the sum of the number of times any of the feature words appear in that candidate response line.

In some embodiments, the weighted correlation response score is the similarity response score for each candidate response line. The similarity response score, so calculated, for each candidate response line is used to extract key information, such as the key response, according to the method 200 of FIG. 2. That is, the response line with the highest similarity response score is determined as the key response.

The method 600 proceeds to step 610, at which the method 600 ends.

In some embodiments, generating the mathematical representation comprises computing an embedding vector (mean-embedding or custom-embedding). In some embodiments, a computing the correlation score between two lines comprises computing a corresponding dot product score or a corresponding L2 norm between the embedding of respective lines.

For example, in the method 200 of FIG. 2, after lines not containing any feature word are removed at step 214, for each of the remaining candidate question lines and candidate response lines, a mean-embedding is computed. For each of the lines corresponding to the speech of the customer, that is, a speaker posing a query (question), concern, or request, a dot product with the embedding of that line is computed with the embedding of every subsequent or following line for the customer. Each of the dot product scores for that question line are summed up to generate a summation dot product question score. In some embodiments, the summation dot product question score for the given question line is further multiplied with a sum of the frequencies of each of the feature words in that question line, to yield a weighted dot product question score. Either of the summation dot product question score or the weighted dot product question score is used as a similarity question score. The question line having the highest similarity question score is identified as the key question.

For each of the lines corresponding to the speech of the agent, that is, a speaker providing a response to the posed query (question), concern, or request, a dot product is computed with an embedding of that response line with the embedding of the identified key question, and with the embedding of every subsequent response line for the agent. Each of the dot product scores for a given response line are added up to generate a summation dot product response score. In some embodiments, the summation dot product response score for the given response line is further multiplied with a sum of the frequencies of each of the feature words in that response line, to yield a weighted dot product response score. Either of the summation dot product response score or the weighted dot product response score is used as a similarity response score. The response line having the highest similarity response score is identified as the key response. The key question and the key response are considered as representative lines of the entire conversation.

While the embodiments of the invention have been described with respect to specific examples, the invention is not limited to such examples. For example, while a customer and agent conversations have been described, the techniques described herein can be extended to extract key information from any conversation between two parties. Further, while only the top question score and top response score have been discussed, top two or any other top number of scores can be used to identify a desired number of key questions or responses.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

I claim:

1. A computer-implemented method for extracting key information from conversational voice data, the method comprising:
   receiving a first speaker text corresponding to a speech of a first speaker in a conversation with a second speaker, the conversation comprising a plurality of turns of speech between the first speaker and the second speaker, the first speaker text comprising a plurality of question lines, each question line corresponding to the speech of the first speaker at a corresponding turn, arranged chronologically;
   identifying a plurality of feature words;
   determining a frequency of occurrence for each of the plurality of feature words in each question line;
   removing, from the plurality of question lines, all question lines which do not contain at least one of the plurality of feature words, to yield a plurality of candidate question lines;
   generating a mathematical representation for each candidate question line;
   computing, using the mathematical representation for each candidate question line, a similarity question score for each candidate question line with respect to each subsequent candidate question line; and
   identifying the candidate question line with the highest similarity question score as a key question.

2. The computer-implemented method of claim 1, further comprising:
   receiving a second speaker text corresponding to a speech of the second speaker, the second speaker text comprising a plurality of response lines, each response line corresponding to the speech of the second speaker at a corresponding turn, arranged chronologically;
   removing, from the plurality of response lines, all response lines which do not contain at least one of the plurality of feature words, to yield a plurality of candidate response lines;
   generating a mathematical representation for each candidate response line;
   computing, using the mathematical representation for each candidate response line, a similarity response score for each candidate response line with respect to the key question, and with respect to each subsequent candidate response line; and
   identifying the candidate response line with the highest similarity response score as a key response.

3. The computer-implemented method of claim 2,
   wherein computing the similarity question score for a candidate question line from the plurality of candidate question lines comprises:
      computing a correlation question score of the mathematical representation for the candidate question line with respect to the mathematical representation of each subsequent candidate question line of the plurality of candidate question lines; and
      adding the correlation question scores for the candidate question line with respect to each subsequent candidate question line of the plurality of candidate question lines, to yield a summation correlation question score, and
   wherein computing the similarity response score for a candidate response line from the plurality of candidate response lines comprises:
      computing a correlation response score of the mathematical representation for the candidate response line with respect to the mathematical representation of the key question, and with respect to the mathematical representation of each subsequent candidate response line of the plurality of candidate response lines; and adding the correlation response scores for the candidate response line with respect to the key question, and with respect to each subsequent candidate response line of the plurality of candidate response lines to yield a summation correlation response score.

4. The computer-implemented method of claim 3, wherein computing the similarity question score for a candidate question line from the plurality of candidate question lines further comprises:

identifying a frequency of occurrence of each of the plurality of feature words in the candidate question line; and multiplying the summation correlation question score with a sum of the frequency of each of the plurality of feature words occurring in the candidate question line to yield a weighted summation correlation question score, and wherein computing the similarity response score for a candidate response line from the plurality of candidate response lines further comprises:

identifying a frequency of occurrence of each of the plurality of feature words for the candidate response line;

multiplying the summation correlation response score with a sum of the frequency of each of the plurality of feature words occurring in the candidate response line to yield a weighted summation correlation response score.

5. The computer-implemented method of claim 1, wherein the mathematical representation comprises computing a mean embedding vector, and wherein a correlation score comprises a dot product score of mean-embedding the candidate question line with respect to each subsequent candidate question line.

6. An apparatus for extracting key information from conversational voice data, the apparatus comprising:

a processor; and a memory communicably coupled to the processor, wherein the memory comprises computer-executable instructions, which when executed using the processor, perform a method comprising:

receiving a first speaker text corresponding to a speech of a first speaker in a conversation with a second speaker, the conversation comprising a plurality of turns of speech between the first speaker and the second speaker, the first speaker text comprising a plurality of question lines, each question line corresponding to the speech of the first speaker at a corresponding turn, arranged chronologically, identifying a plurality of feature words, determining a frequency of occurrence for each of the plurality of feature words in each question line, removing, from the plurality of question lines, all question lines which do not contain at least one of the plurality of feature words, to yield a plurality of candidate question lines, generating a mathematical representation for each candidate question line, computing, using the mathematical representation for each candidate question line, a similarity question score for each candidate question line with respect to each subsequent candidate question line, and identifying the candidate question line with the highest similarity question score as a key question.

7. The apparatus of claim 6, wherein the method further comprises:

receiving a second speaker text corresponding to a speech of the second speaker, the second speaker text comprising a plurality of response lines, each response line corresponding to the speech of the second speaker at a corresponding turn, arranged chronologically;

removing, from the plurality of response lines, all response lines which do not contain at least one of the plurality of feature words, to yield a plurality of candidate response lines;

generating a mathematical representation for each candidate response line;

computing, using the mathematical representation for each candidate response line, a similarity response score for each candidate response line with respect to the key question, and with respect to each subsequent candidate response line; and identifying the candidate response line with the highest similarity response score as a key response.

8. The apparatus of claim 7, wherein computing the similarity question score for a candidate question line from the plurality of candidate question lines comprises:

computing a correlation question score of the mathematical representation for the candidate question line with respect to the mathematical representation of each subsequent candidate question line of the plurality of candidate question lines; and adding the correlation question scores for the candidate question line with respect to each subsequent candidate question line of the plurality of candidate question lines, to yield a summation correlation question score, and wherein computing the similarity response score for a candidate response line from the plurality of candidate response lines comprises:

computing a correlation response score of the mathematical representation for the candidate response line with respect to the mathematical representation of the key question, and with respect to the mathematical representation of each subsequent candidate response line of the plurality of candidate response lines; and adding the correlation response scores for the candidate response line with respect to the key question, and with respect to each subsequent candidate response line of the plurality of candidate response lines to yield a summation correlation response score.

9. The apparatus of claim 8, wherein computing the similarity question score for a candidate question line from the plurality of candidate question lines further comprises:

identifying a frequency of occurrence of each of the plurality of feature words in the candidate question line; and multiplying the summation correlation question score with a sum of the frequency of each of the plurality of feature words occurring in the candidate question line to yield a weighted summation correlation question score, and wherein computing the similarity response score for a candidate response line from the plurality of candidate response lines further comprises:

identifying a frequency of occurrence of each of the plurality of feature words for the candidate response line;

multiplying the summation correlation response score with a sum of the frequency of each of the plurality of feature words occurring in the candidate response line to yield a weighted summation correlation response score.

10. The apparatus of claim 6, wherein the mathematical representation comprises computing a mean embedding vector, and wherein a correlation score comprises a dot product score of mean-embedding the candidate question line with respect to each subsequent candidate question line.

11. A non-transitory computer-readable storage medium, the computer-readable storage medium including instructions that when executed by a computer, cause the computer to perform a method for extracting key information from conversational voice data, the method comprising:
   receiving a first speaker text corresponding to a speech of a first speaker in a conversation with a second speaker, the conversation comprising a plurality of turns of speech between the first speaker and the second speaker, the first speaker text comprising a plurality of question lines, each question line corresponding to the speech of the first speaker at a corresponding turn, arranged chronologically;
   identifying a plurality of feature words;
   determining a frequency of occurrence for each of the plurality of feature words in each question line;
   removing, from the plurality of question lines, all question lines which do not contain at least one of the plurality of feature words, to yield a plurality of candidate question lines;
   generating a mathematical representation for each candidate question line;
   computing, using the mathematical representation for each candidate question line, a similarity question score for each candidate question line with respect to each subsequent candidate question line; and
   identifying the candidate question line with the highest similarity question score as a key question.

12. The non-transitory computer-readable storage medium of claim 11, further comprising:
   receiving a second speaker text corresponding to a speech of the second speaker, the second speaker text comprising a plurality of response lines, each response line corresponding to the speech of the second speaker at a corresponding turn, arranged chronologically;
   removing, from the plurality of response lines, all response lines which do not contain at least one of the plurality of feature words, to yield a plurality of candidate response lines;
   generating a mathematical representation for each candidate response line;
   computing, using the mathematical representation for each candidate response line, a similarity response score for each candidate response line with respect to the key question, and with respect to each subsequent candidate response line; and
   identifying the candidate response line with the highest similarity response score as a key response.

13. The non-transitory computer-readable storage medium of claim 12, wherein computing the similarity question score for a candidate question line from the plurality of candidate question lines comprises:
   computing a correlation question score of the mathematical representation for the candidate question line with respect to the mathematical representation of each subsequent candidate question line of the plurality of candidate question lines; and
   adding the correlation question scores for the candidate question line with respect to each subsequent candidate question line of the plurality of candidate question lines, to yield a summation correlation question score, and
   wherein computing the similarity response score for a candidate response line from the plurality of candidate response lines comprises:
   computing a correlation response score of the mathematical representation for the candidate response line with respect to the mathematical representation of the key question, and with respect to the mathematical representation of each subsequent candidate response line of the plurality of candidate response lines; and
   adding the correlation response scores for the candidate response line with respect to the key question, and with respect to each subsequent candidate response line of the plurality of candidate response lines to yield a summation correlation response score.

14. The non-transitory computer-readable storage medium of claim 13, wherein computing the similarity question score for a candidate question line from the plurality of candidate question lines further comprises:
   identifying a frequency of occurrence of each of the plurality of feature words in the candidate question line; and
   multiplying the summation correlation question score with a sum of the frequency of each of the plurality of feature words occurring in the candidate question line to yield a weighted summation correlation question score, and
   wherein computing the similarity response score for a candidate response line from the plurality of candidate response lines further comprises:
   identifying a frequency of occurrence of each of the plurality of feature words for the candidate response line;
   multiplying the summation correlation response score with a sum of the frequency of each of the plurality of feature words occurring in the candidate response line to yield a weighted summation correlation response score.

15. The non-transitory computer-readable storage medium of claim 11, wherein the mathematical representation comprises computing a mean embedding vector, and wherein a correlation score comprises a dot product score of mean-embedding the candidate question line with respect to each subsequent candidate question line.

* * * * *